United States Patent [19]
Fingerle

[11] 3,730,599
[45] May 1, 1973

[54] BEARING ASSEMBLY FOR SPINNING ROTORS

[75] Inventor: Rudolf Fingerle, Esslingen-Zollberg, Germany

[73] Assignee: SKF Kugellagerfabriken GmbH, Schiweinfurt, Germany

[22] Filed: Mar. 30, 1971

[21] Appl. No.: 129,365

[30] Foreign Application Priority Data

Apr. 2, 1970 Japan..................................45/31048

[52] U.S. Cl..................................................308/187
[51] Int. Cl..............................................F16c 33/78
[58] Field of Search ..................184/105; 137/515.1; 308/187

[56] References Cited

UNITED STATES PATENTS

| | | | |
|---|---|---|---|
| 2,234,238 | 3/1941 | Forsberg | 184/105 |
| 2,326,161 | 8/1943 | Nelson | 308/187 |
| 2,328,327 | 8/1943 | Cobb | 184/105 |
| 2,727,280 | 12/1955 | Waite | 308/187 |

FOREIGN PATENTS OR APPLICATIONS 393,956 6/1965 Switzerland.....................137/525.1

*Primary Examiner*—Charles J. Myhre
*Assistant Examiner*—Frank Susko
*Attorney*—Richard Low and Murray Schaffer

[57] ABSTRACT

A bearing assembly comprising a hollow cylindrical housing in which a shaft is axially arranged. The shaft and housing are enclosed at each end. A radial opening is provided in the housing forming an inlet port for lubricant. The opening is covered by an elastomeric sealing member penetrable by a lubricating tool.

12 Claims, 4 Drawing Figures

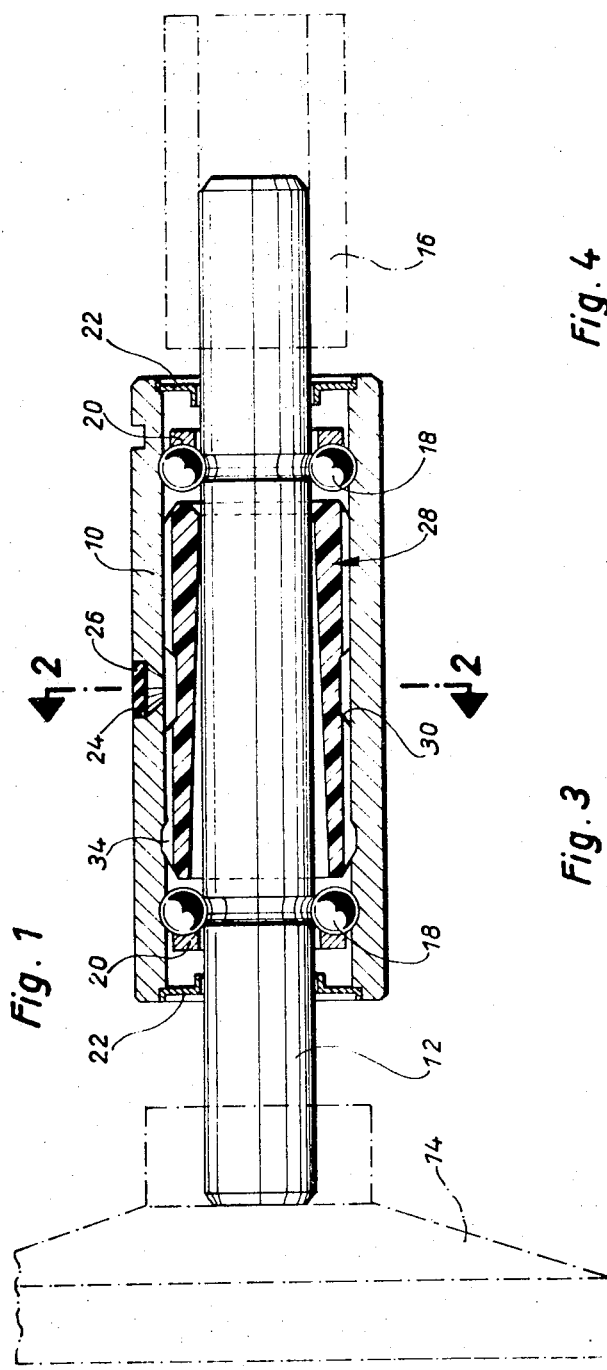

BEARING ASSEMBLY FOR SPINNING ROTORS

BACKGROUND OF INVENTION

The present invention relates to bearing assemblies and in particular to bearing assemblies for rotating shafts for mounting spinning rotors and the like.

Spinning rotors have been conventionally mounted at the end of a shaft journalled by anti-friction bearings in a closed bearing housing. The shaft extends axially from the end of the housing and is provided with a whorl, pulley or other means by which the shaft is then rotated. Assemblies of this type were originally designed as completely sealed units and it was impossible to provide for lubrication once the assembly was constructed. It was assumed that the very high rotatory speed of the units would cause the assembly to wear or break down long before the need for supplemental lubrication arose. It has been discovered, however, that with the high precision at which the bearings and assemblies have been manufactured, that they will in fact have a very long life even after the original lubricant has aged and become useless or spent. Further supplemental lubrication is therefore desirable and necessary to insure a most efficient and economical operation of the spinning rotors.

It is the object of the present invention to provide a bearing assembly for rotatory shafts which may be easily and efficiently provided with supplemental lubrication.

It is an object of the present invention to provide an essentially sealed bearing assembly capable of being supplied with supplemental lubrication without destroying the sealed quality of the bearing.

It is another object of the present invention to provide means for supplying supplemental lubricant economically and without major modification of bearing units originally designed without provision for supplemental lubrication.

These objects, others, and numerous advantages will be obvious from the description of the present invention which follows hereinafter.

SUMMARY OF THE INVENTION

According to the present invention a bearing assembly is provided comprising a hollow cylindrical housing having a shaft axially arranged within the housing and extending outwardly therefrom and covered to provide a substantially sealed interior. The shaft is journalled by spaced anti-friction bearings for rotation about its central axis and is provided at one exterior end with the spinning rotor and at the other with means for its rotation. A radial opening, providing a lubricant inlet port, is formed in the wall of the housing and is covered with an elastomeric member which may be penetrated by the lubricating tool and which is resealable on removal of the tool.

The elastomeric material may be such that it is readily penetrated by a hollow needle or similar instrument, or may be provided with one or more resealable flaps permitting entry of the mouthpiece or spout of a lubricant dispenser. The cover may be a disk secured within the opening or covering the opening or even a band encircling the housing.

Preferably the assembly is provided with a sleeve arranged intermediate the housing and the shaft with which it defines one or more storage and dissemination chambers for feeding of lubricant directly to the anti-friction bearings. In one form the sleeve is also made of elastomeric material enabling the shaft to be shifted to allow assembly of the bearings. In another form the sleeve is rigid.

Full details of the present invention are set forth in the following description and will be seen in the accompanying drawing.

BRIEF DESCRIPTION OF DRAWINGS

In the accompanying drawing:

FIG. 1 is a longitudinal section of a bearing assembly constructed in accordance with the present invention, FIG. 2 is a sectional view taken along line 2—2 of FIG. 1, FIG. 3 is a perspective view of a modified resilient cover member shown in the embodiment of FIG. 1, and FIG. 4 is a longitudinal section of another embodiment of the present invention.

DESCRIPTION OF INVENTION

In the embodiment of FIG. 1 the bearing assembly comprises hollow cylindrical bearing housing 10 in which a drive shaft 12 is coaxially arranged and which extends outwardly of both ends of the housing. A spinning rotor 14 is fixedly secured at one end of the shaft while a drive whorl 16 such as a pulley, fly member or other drive means by which the shaft is rotated at high speeds is secured at its other end. The shaft 12 is rotatably journalled in the housing 10 by at least two spaced anti-friction bearings preferably in the form of balls 18 located in running or race grooves oppositely formed on both the interior circumferential wall of the housing 10 and the outer circumferential wall of the shaft 12. A snap ball bearing cage 20 is arranged to hold the balls 18 in rotational alignment and prevent axial movement. Each end of the bearing housing 10 is closed by resilient disk shaped caps 22 which although spaced from the shaft 12 closes it and prevents entrance of dust, dirt, and other contaminants thus completing an essentially sealed bearing assembly. The caps 22 are radially spaced a small distance from the shaft 12 so as to permit free rotation of the shaft.

In accordance with the present invention a radial inlet, port, or opening 24 is provided into the wall of the housing 10 substantially mid-way along its length. As the hole or opening 24 passes from the exterior to the interior of the wall it is first formed with a cylindrical shape changing then into a concentric tapered conical or funnel shape, so that a cylindrical portion is exposed to the exterior while only a small hole is exposed to the interior. A resilient solid elastomeric disk shaped cover 26 conforming to the cylindrical portion is inserted in the hole 24. The covering member 26 firmly seats within the hole 24 and is preferably dimensioned to provide a smooth exterior surface with housing 10 and not to be dislodged by vibration of the bearing housing during operation. The cover member 26 may be force fit or glued or otherwise securely adhered in the opening 24.

To facilitate the diffusion of the lubricant about the bearing shaft 12 there is interposed between it and the wall of the housing 10, a sleeve 28. The sleeve extends axially between the ball bearings 18 terminating just short of each of them. The sleeve 28 furthermore has an outside diameter substantially equal to inner diameter of the bearing housing so as to be force fit with it. The inner diameter of the sleeve 28 tapers conically axially of its length, flaring outwardly toward the end on which the spinning rotor 14 is secured. This taper of the inner bore of the sleeve allows the shaft 12 to be moved obliquely with respect to the longitudinal axis of the housing to permit the balls 18 to be inserted in their grooves when the structure is assembled. The drive shaft 12 is arranged within the sleeve 28 so that it does not contact the interior surfaces of the sleeve when it is rotating. The smallest diameter of the sleeve 28 is formed accordingly. A circumferential groove 30 arranged in the transverse plane of the inlet port 24 is formed on the exterior surface of sleeve 28 which also is provided with one or more longitudinal grooves 32, which as seen in FIG. 2 constitute four in number equally spaced about the circular cross section of the sleeve. The grooves 32 extend over the entire length of the sleeve 28, intersecting with the annular groove 30, and define individual lubricating storage spaces in cooperation with the inner wall surfaces of the bearing housing.

The intermediate sleeve 28 is made of resiliently yieldable material, particularly plastic or synthetic rubber resistant to oils and lubricants and is provided with a collar ring 34 on its outer circumference near its frontal end adjacent the spinning rotor, which engages a correspondingly formed and mating groove in the wall of the housing 10. The collar 34 and its associated groove may be located at the other end of the sleeve if desired. The mating ring 34 and groove secure the position of the sleeve 28 fixedly with respect to the balls 18 and with respect to the inlet port 24.

The resilient cover 26 is preferably made of plastic or synthetic rubber which is highly resistant to decay under prolonged contact with oil or lubricant. The cover material is selected so as to be readily and repeatedly penetrated or puncturable by application of a tool such as a hollow needle which may or may not be provided with a slant or sharpened point. Further the material of the cover 26 is selected so that even after repeated puncturings it is selfsealing and automatically reclosable.

Lubricant is supplied to the bearing unit just described from conventional lubricant sources such as reservoirs or containers by use of automatic applicator devices or by use of standard portable oilers having a mouthpiece or spout. More permanent or fixed systems may be employed in which the lubricant may be fed from a stationary container or reservoir through a fixed or flexible conduit. To apply the lubricant the hollow needle is attached to the oiler spout, or conduit mouthpiece and inserted into the opening 24 through the resilient cover 26. The shape of the inlet opening 24 directs the needle and the lubricant into the grooves 30 and 32 of the sleeve 28. The lubricating needle will easily pierce the puncturable cover 26 without affecting its normal sealing ability and supply lubricant directly into the interior of the bearing housing either through gravitational flow or under/pressure from the oiler. By locating the inlet port 24 and the circumferential groove 30 in the sleeve 28 at substantially the axial center the lubricant will be distributed in such a manner that substantially equal amounts of lubricant reach each of the ball bearings 18. On withdrawal of the oiler or conduit spout and the removal of the needle from the resilient cover 26 the cover material closes and seals itself so that leakage of lubricant from within the bearing is prevented, retaining all of the lubricant supplied within the bearing housing 10.

In FIG. 3 a modified form of cover member 24 is shown. Here the cover member 36 is also made from similarly resiliently yieldable material as cover 26 but with a pair of crossed slots 38 extending from the outer through the inner surfaces. The crossed slots 38 provide four triangular resilient and flexible flap sectors 40 which are yieldable to the urging of the lubricating conduit or the spout of a conventional oiler. With this embodiment the sharp needle does not have to be used since the flaps 40 will open on urging of the more rounded and stubby configuration of an oiler or conduit spout. The flexibility of the flap 40 enable the spout to flex the flaps sufficiently so that they rest or contact the conical surface of the opening 24 thus opening the cover 36 with a sufficiently wide passage to permit the entrance of the spout into the bearing and thus insure the feeding of lubricant. The tapered surface, however, limits the passage so that the spout can be made to seat and seal with the elastomeric cover. Removal of the oiler and withdrawal of the spout causes the individual flaps 40 to re-flex into their originally sealed condition. Under normal condition the flaps 40 are located in a common plane so that effective seal is made even against the normal pressures produced within the bearing housing 10.

In FIG. 4 still another embodiment is shown. In this embodiment the bearing housing 42 is similarly a substantially hollow cylindrical member in which a shaft 44 is journalled. The wall of the bearing housing 42 is provided with a radially directed inlet port or opening 46 which is also inwardly conically shaped in part as in the embodiment of FIG. 1. A relatively shallow groove 48 is provided on the external surface of the bearing housing 42 which encircles the housing transversely of its longitudinal axis. The inlet opening 46 lies within the groove 48. An elastomeric band 50 of resilient puncturable or penetrable plastic or synthetic rubber material resistant to oil or lubricant and conforming to the width of the groove 48 girdles the housing within the groove and covers the opening 46. The shaft 44 is journalled in a pair of spaced ball bearings 52 which are retained in a race groove formed on the exterior surface of the shaft, and in an outer ring race 54 set into the bearing housing 42. The ends of the bearing housing are each closed by means of cover members 56 which define small annular spaces with the shaft 44.

An intermediate hollow cylindrical sleeve 58 surrounds the shaft 44 and is arranged between the ball bearings 52. The axial ends of the sleeve 58 abut against the outer ring races 54, and are cut back axially to provide spaces adjacent the ball bearings 52. The sleeve 58 need not be made of resilient material since the unit can be assembled without shifting of the shaft 44 by a simple axial insertion of the sleeve 58, the balls 52 and their outer races 54 and the caps 56.

The outer diameter of the sleeve 58 is substantially equal to the inner diameter of the bearing housing 42 so that close or force fit is provided securing the sleeve within the housing. The inner wall of the housing 42 is cut back or radially enlarged over at least a portion of the axial length of the sleeve 58 so than an annular chamber 60 is formed surrounding the sleeve 58 which is closed at both ends by the fit of the sleeve within the housing. The inner bore of the sleeve is formed in two steps. Centrally it too is enlarged or cut back over a substantial portion of its length to provide a chamber 62 surrounding the central portion of shaft 44. The axial ends of the inner bore of the sleeve 58 is, however, provided with a smaller diameter but one that is still larger than that of the shaft 44 so that annular gaps 64 and 66 are provided at each end of the sleeve respectively. The gaps 64 and 66 connect the interior chamber 62 with each of the spaces between the ends of the sleeve and the ball bearings 52. At least one radially directed duct 68 is provided in the wall of the sleeve 58 so that the exterior chamber 60 communicates with the interior chamber 62.

The annular girdle or ring covering member 50 is made of similar material as the cover 26 of the embodiment shown in FIG. 1. It too may be repeatedly punctured by a needle or similar hollow piercing element on the end of a suitable lubricant dispenser such as an oiler can so that lubricant can be supplied to the interior of the bearing housing. The lubricant passes from the inlet 46 through the exterior chamber 60, the duct 68, the interior chamber 62, and axially outward of the annular gaps 64 and 66 into contact with the ball bearings 52. The simultaneous rotation of the drive shaft 44 enhances the flow of the lubricant and its ability to surround and protect the ball bearings.

In order to prevent leakage or escape of lubricant axially from the bearing housing through the annular spaces defined between caps 56 and the outer circumference of the drive shaft 44 a flanged sleeve 70 is secured to the shaft between each of the ball bearings 52 and the caps 56. The radially extending flanges 72 of the sleeve are spaced a small distance axially from the interior surface of each cap 56 so that the cap 56 does not interfere with the rotation of shaft 44 and sleeve 70. On rotation of the shaft the flange 72 acts as a centrifugal disk preventing leakage of oil between the spaces of the cap member.

From the foregoing it will be seen that the present invention provides an improved bearing assembly having essentially its originally sealed condition, but which may be provided with supplemental lubrication in may ways without modifying its sealed character. A conventional lubricating device, pump, dispenser, oiler, can, or the like may be provided either with a hollow needle or a narrow spout. The elastomeric cover element is pierced or penetrated by only the needle or spout and is immediately resealable on withdrawal. Contami-nation of the inside of the bearing is thus prevented. Preferably the lubricant is a dispersion of relatively heavy grease in a liquid solvent which solvent readily evaporates once injected into the assembly leaving a grease film on the bearings. The impervious elastomeric cover is most suitable for use with the needle applicator, however the slotted or cut cover provides efficient automatic sealing and better means for use with a more ordinary spout.

The radial opening providing a concentric taper with a cylindrical portion or ring depression allows the cover to be either disk shaped or shaped as a band and permits it to be firmly seated so that it cannot be dislodged. Other shapes and forms of securing the cover may also be used. Both the disk cover and the band can be made of thin synthetic rubber or plastic material. Suitable adhesives may be used.

The conical type of the opening insures positive directional entry of the needle and the spout and distension or separation of the flaps of the slit embodiment so that a definite passage is provided into the interior of the housing. The tapered surface of the opening further provides a limit to the opening made by forcing the spout through the cover so that a seal can be made between the spout and the cover when lubricant is dispensed.

A further advantage is obtained by the provision of the intermediate sleeve which insures uniform distribution of the lubricant to each of the anti-friction bearings. The provision of chambers for storage of lubricant within the bearing housing has the additional advantage of enabling the supply of sufficient lubricant at original assembly, thus requiring the supply of only small amount of supplemental lubrication over extended intervals of time. As seen and discussed previously the lubricant is caused to flow about the shaft, within the sleeve as well as axially toward the anti-friction bearings.

The centrifugal sealing disk at each end of the housing provides an effective means for preventing leakage of lubricant even though the shaft must be allowed to rotate with respect to the end caps. The disk also provides for improved circulation of the lubricant.

Since various modifications and changes have been suggested and other will still be readily obvious to those skilled in this art, it is intended that the present disclosure be taken as illustrative only of the present invention and not as limiting of it.

What is claimed is:

1. A bearing assembly comprising a hollow cylindrical housing, a shaft axially arranged within said housing and extending outwardly of each end, means surrounding said shaft for closing the ends of said housing, spaced anti-friction bearings rotatably journalling said shaft within said housing, a radial opening formed in the wall of said housing between said bearing, an elastomeric cover securing said opening, said cover being penetratable by means for supplying lubricant to said anti-friction bearings and a hollow cylindrical sleeve intermediate said housing and said shaft, said sleeve being spaced from at least in part from the inner wall of said housing and from the outer wall of said shaft and arranged between said anti-friction bearings, said sleeve defining a lubricant storage chamber surrounding said shaft and a channel communicating with said radial opening and said anti-friction bearings for the free flow of lubricant directly therebetween.

2. The assembly according to claim 1, wherein said housing is formed with a shallow circumferential groove on its outer wall surface, said radial opening being located within said groove and said elastomeric cover comprises an annular band secured within said groove.

3. The assembly according to claim 1 wherein said radial opening is provided with a cylindrical portion adjacent the outer wall surface of said housing and said elastomeric cover comprises a disk shaped member secured within said cylindrical portion.

4. The assembly according to claim 3 wherein said disk shaped cover is provided with at least one slot formed therein enabling creation of a passage on application of pressure to said cover.

5. The assembly according to claim 4 wherein said cover is formed with two slots, said slots intersecting each other in a cross thereby providing four flexible flaps forming said passage.

6. The assembly according to claim 1, wherein said radial opening has an inwardly directed conical portion adjacent the inner wall of said housing.

7. The assembly according to claim 1 wherein the outer wall of said sleeve is provided with a plurality of grooves extending longitudinally from one end to the other and a circumferential groove interconnecting said longitudinal grooves, said circumferential groove being aligned in the transverse plane of said radial opening.

8. The assembly according to claim 1 wherein said sleeve is made of elastomeric material and its inner wall is conical from one end to the other.

9. The assembly according to claim 1 wherein said sleeve is provided with an annular circumferential collar on its outer wall, and said housing is formed with an annular groove in its inner wall in which said collar is received to thereby secure said sleeve against axial movement.

10. The assembly according to claim 1, said sleeve defining in cooperation with said housing a first annular storage chamber sealed at each end and communicating with said radial opening, said sleeve defining with said shaft a second annular chamber open at each end for communication with said anti-friction bearings and including at least one radial duct connecting said first and second chambers for flow of lubricant.

11. The assembly according to claim 10 wherein said anti-friction bearings are arranged in an inner race formed on said shaft and an outer race secured to said housing, said sleeve being formed of rigid material having a peripheral edge at each end abutting said outer race and defining therewith a space surrounding said anti-friction bearings.

12. The assembly according to claim 1 including a radial disk secured to said shaft adjacent the closing means at each end of said housing, said radial disk being spaced from said cover member and being rotatable by said shaft to provide centrifugal means for preventing flow of lubricant axially from said housing.

* * * * *